(12) United States Patent
Uchida

(10) Patent No.: US 8,120,803 B2
(45) Date of Patent: Feb. 21, 2012

(54) DYNAMIC ADVERTISEMENT ALLOCATION

(75) Inventor: Yuki Uchida, Toronto (CA)

(73) Assignees: Ricoh Company, Ltd., Tokyo (JP); Ricoh Corporation, West Caldwell, NJ (US)

( * ) Notice: Subject to any disclaimer, the term of this patent is extended or adjusted under 35 U.S.C. 154(b) by 1088 days.

(21) Appl. No.: 11/807,001

(22) Filed: May 24, 2007

(65) Prior Publication Data

US 2008/0291471 A1  Nov. 27, 2008

(51) Int. Cl.
*G06F 3/12* (2006.01)

(52) U.S. Cl. ............ 358/1.15; 358/1.18; 358/1.13; 705/14.4; 705/14.41; 705/14.42; 705/14.1; 705/14.72; 705/14.73; 705/14.69; 705/14.49; 705/14.22; 705/14.58

(58) Field of Classification Search .......... 358/1.15, 358/1.18, 1.13; 382/14.1, 14.4, 14.49–14.58, 382/14.22; 705/14.1, 14.4, 14.49–14.58, 705/14.22, 14.67, 14.69, 14.2, 14.21, 14.48, 705/14.41–14.42, 14.72–14.73
See application file for complete search history.

(56) References Cited

U.S. PATENT DOCUMENTS

| | | | |
|---|---|---|---|
| 5,513,254 A | 4/1996 | Markowitz | |
| 5,642,205 A | 6/1997 | Kassmann | |
| 5,907,830 A | 5/1999 | Engel et al. | |
| 5,909,673 A | 6/1999 | Gregory | |
| 5,926,795 A | 7/1999 | Williams | |
| 6,075,971 A | 6/2000 | Williams | |
| 6,076,068 A * | 6/2000 | DeLapa et al. | 705/14.26 |
| 6,118,546 A | 9/2000 | Sanchez et al. | |
| 6,243,172 B1 | 6/2001 | Gauthier et al. | |
| 6,311,185 B1 * | 10/2001 | Markowitz et al. | 1/1 |
| 6,313,921 B1 | 11/2001 | Kadowaki | |
| 6,334,109 B1 * | 12/2001 | Kanevsky et al. | 705/14.67 |
| 6,336,098 B1 | 1/2002 | Fortenberry et al. | |
| 6,615,183 B1 | 9/2003 | Kolls | |
| 6,891,635 B2 * | 5/2005 | Dutta | 358/1.15 |
| 6,891,636 B1 * | 5/2005 | Kawai et al. | 358/1.18 |
| 7,019,856 B2 * | 3/2006 | Kawabata | 358/1.15 |
| 7,154,630 B1 * | 12/2006 | Nimura et al. | 358/1.18 |
| 7,385,717 B2 * | 6/2008 | Hobbs | 358/1.15 |
| 2002/0178051 A1 | 11/2002 | Golden et al. | |
| 2004/0030600 A1 * | 2/2004 | Lacroix | 705/16 |
| 2006/0126119 A1 * | 6/2006 | Morales et al. | 358/1.18 |
| 2008/0140500 A1 * | 6/2008 | Kurkure | 705/10 |

FOREIGN PATENT DOCUMENTS

| | | |
|---|---|---|
| JP | 9-66649 | 3/1997 |
| JP | 2004-7782 | 1/2004 |

OTHER PUBLICATIONS

"2D Barcodes Explained", www.barcodeman.com/faq/2d.php—Apr. 17, 2007.
U.S. Appl. No. 09/563,266, filed May 11, 2000.
U.S. Appl. No. 11/796,377, filed Apr. 27, 2007.

* cited by examiner

*Primary Examiner* — Jacky X Zheng

(74) *Attorney, Agent, or Firm* — Cooper & Dunham LLP

(57) ABSTRACT

Methods, apparatuses and systems for providing one or more advertisements on a printout of a print job are provided. The advertisements are selected based on dynamic selection criteria.

22 Claims, 7 Drawing Sheets

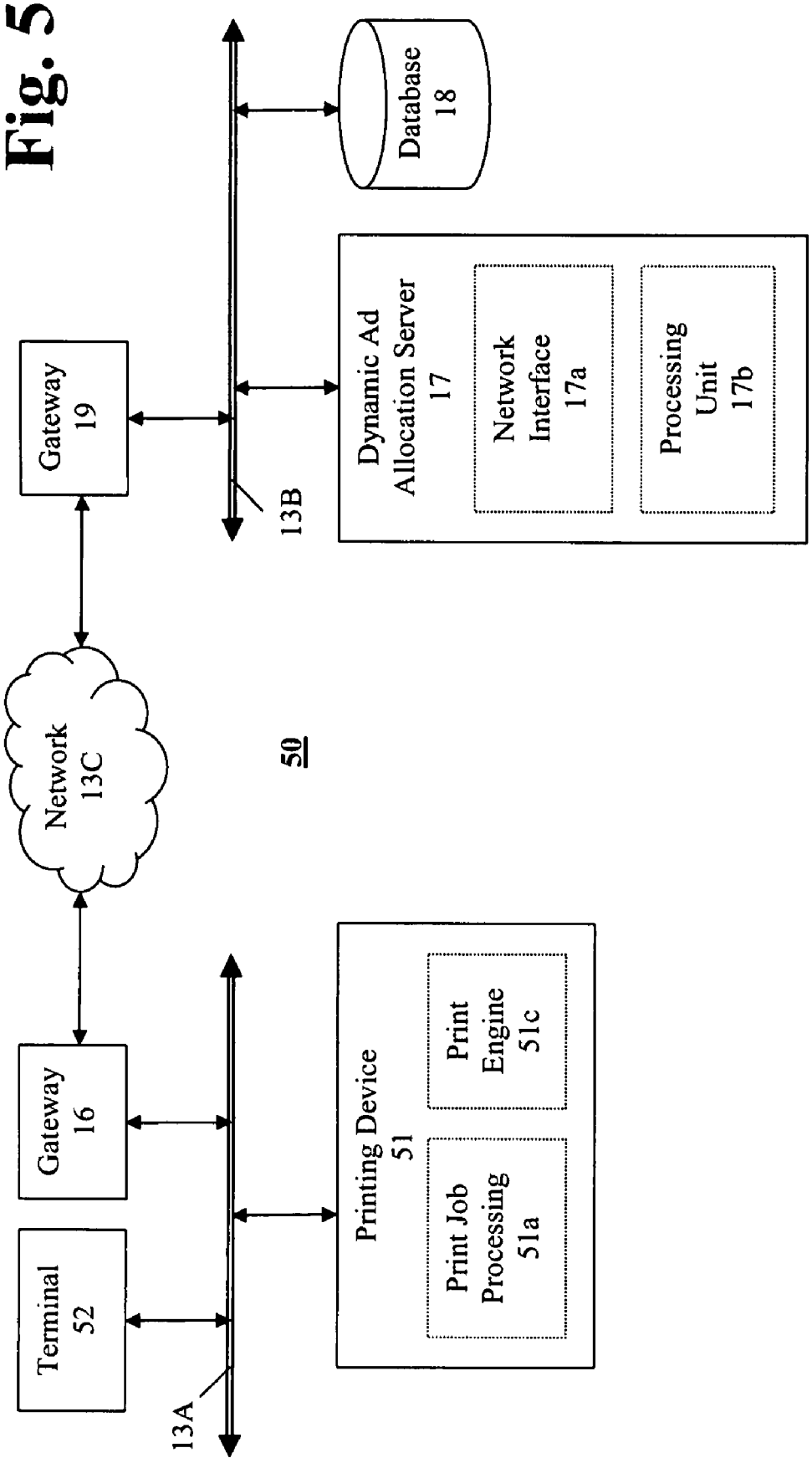

DYNAMIC ADVERTISEMENT ALLOCATION

TECHNICAL FIELD

This disclosure relates to printouts generated by a printer or other image forming equipment. In particular, the disclosure relates to providing one or more advertisements on a printout of a print job by such printer or other image forming equipment.

BACKGROUND

In the current information age, there are often discussions of the desirableness of a paperless society. However, notwithstanding such discussions, there remains a great need by users of computers and other information terminals (that is, any of the various conventional devices which have a need to print on demand, such as personal computers, notebook computers, workstations, other types of computers, kiosks, PDAs, other information appliances, etc.) for printing functionality. Therefore, devices having printing or plotting functionality, such as printers, copiers, multi-function devices, etc., continue to play a significant role in information technology (IT) at home, at work, as well as elsewhere (for example, away from the office and/or home).

In many circumstances, the user is charged a fee for printing. For example, kiosks are provided in some transportation depots and other public areas to enable users to access assorted content (for example, e-mails, web pages, other selected web content, etc.) via the Internet or otherwise, and the user may be charged a fee to print. As another example, Internet cafes provide members of the public with Internet access, for a fee, through personal computers, and the user may be charged an additional fee to print from the computers. In addition, some enterprises and organizations recoup some or all of the cost of IT facilities by charging usage fees (such as for each use, each specified time period, etc.) for selected IT functionalities to users or to the group or department with which the user is associated.

However, there are other ways of recouping the cost of IT facilities, other than by charging a usage fee.

Conventional printers process print jobs received from user terminals and typically output a printout that faithfully represents the print job received from the user terminal. However, there are many instances in which one or more areas of a printout are unused, and can be used for other purposes to minimize waste of paper.

For example, a printer can be configured through appropriate settings to automatically print cover or partition sheets that contain information such as the identity of the print job, the time, the name of the user who sent the print job, etc., to accompany the printout of the print job submitted by the user. Such cover or partition sheets serve to identify the print job corresponding to the accompanying printout. However, such cover or partition sheets typically have little use after the printout is picked up by the user. Further, such cover or partition sheets typically have much unused space. It has been proposed in U.S. application Ser. No. 09/563,266, to merge advertisements, such as coupons and other marketing information, with a print job, by printing the advertisements on unused space on cover sheets and partition sheets which are printed with a print job.

In addition, it has been proposed in Japanese Patent Application Publication No. 2004-7782, to combine advertisements with a print job by superimposing the advertisements on a margin area of the printout.

Further, some current point-of-sales systems print receipts on paper that has preprinted advertisements on the back of the paper.

However, conventional printing systems which print an advertisement along with a print job print the same (one or more) advertisements over and over.

There is need for an improved technique for recouping the cost of printing which in addition allows advertisers to couple their advertisements to a print medium in a dynamic and relevant manner.

BRIEF SUMMARY

This disclosure provides an approach for using printouts as advertisement media in a dynamic and relevant manner. In such an approach, the cost of printing can be shifted from the user to advertisers, and greater utility can be obtained from print media.

A method for presenting advertisement on a printout of a print job is provided which includes selecting one of a plurality of advertisements stored in a database based on dynamic selection criteria. In one aspect of the disclosure, the dynamic selection criteria includes taking into account the prices paid by advertisers. For example, advertisements of advertisers who pay a higher price are more likely to be on any particular printout than those of an advertiser who pays a lower price. When the cost of printing is recovered from fees collected from advertisers, printing may be free of charge to the user.

In another aspect of the disclosure, the dynamic selection criteria takes into account the time of day, week, month or year, such that different advertisements are selected from different advertisement pools depending on the relevant temporal period (day, week, month, season, etc.). The advertiser can select the temporal period in which its advertisement is to be output. The advertisements may specify a limited effective term.

In a third aspect of the disclosure, the dynamic selection criteria takes into account the location of the printing device and/or location of the terminal device from which the print request was received. Accordingly, advertisers can specify that their advertisements are selected according to location of the user or printing device. For example, advertisements from a first advertisement pool are printed when the print request is from a location in a transportation depot, advertisements from a second pool are printed when the printout is generated at a kiosk, advertisements from a third advertisement pool are printed when the print request is from a terminal in a library, etc.

The advertisement is preferably placed at a portion of the printout wherein other information (for example, in the originally submitted print job) is not compromised. For example, advertisements may be placed on margins or the backside of the printouts, wherein information is typically not printed. However, in another aspect of the disclosure, the paper on which the printout is generated is slightly larger than the paper size expected by the user. For example, when the user expects a letter-sized (8.5"×11") printout, the advertisement may be printed along with the print job on legal-size (8.5"× 14") paper, with the advertisement being printed on the additional (3") length of paper (and the originally-submitted print job being printed on the letter-sized portion of the printout, as expected by the user).

When the printed advertisement is in the form of a coupon, the coupon is preferably accompanied by bar code information. The bar code information enables compilation of exposure rate information when the coupons are redeemed.

BRIEF DESCRIPTION OF THE DRAWINGS

The features of the present disclosure can be more readily understood from the following detailed description with reference to the accompanying drawings wherein:

FIG. 5 shows a block diagram of a printing system wherein a printing device is configured to communicate directly with the dynamic ad allocation server, in accordance with another embodiment of the present disclosure.

DETAILED DESCRIPTION OF EXEMPLARY EMBODIMENTS

Figure 1A:
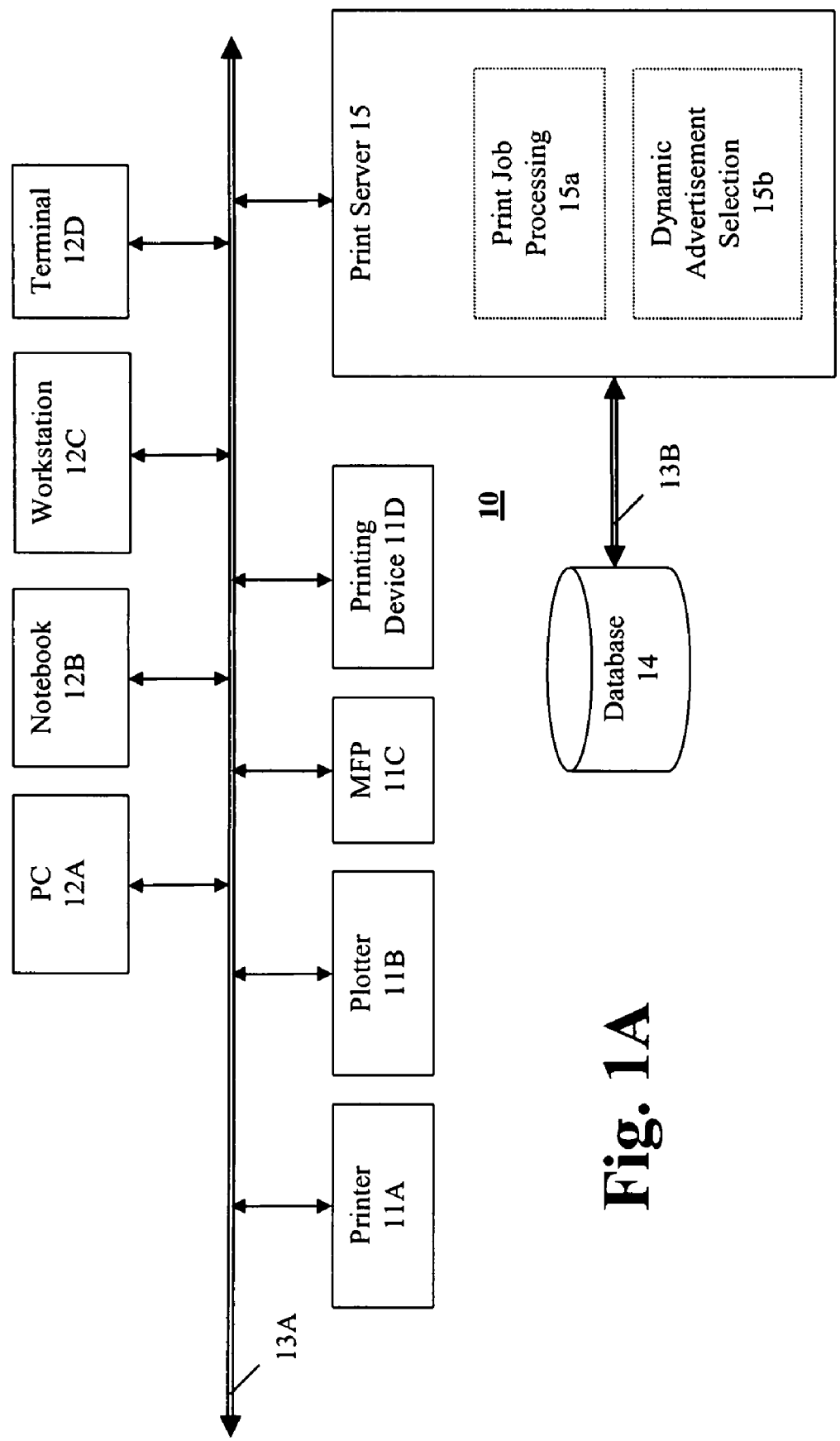
FIG. 1A shows a block diagram of a printing system, in accordance with an embodiment of the present disclosure.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

This disclosure provides tools for enhancing the utility of print media by including in printouts of print jobs advertisements selected according to dynamic selection criteria. Exemplary embodiments are described below wherein the cost of printing is recouped through charges to the advertiser for paid advertisement, and thus users can obtain printouts, with advertisements, free of charge.

The term "advertisement" is used in a broad manner to signify almost any information that the advertiser wishes to broadcast to the public (although preferably in a targeted manner), and may include information regarding products and services (such as coupons), general announcements of a commercial or noncommercial nature, information resorting to a personal appeal, etc.

The terms "printer" and "printing device" are used hereinafter generically to include any output device having a printing or plotting functionality, and include multi-function devices having a copy and/or scanning functionality in addition to the printing or plotting functionality.

In an exemplary embodiment shown in FIG. 1A, a printing system 10 includes a selection of printing devices, such as printer 11A, plotter 11B, MFP (multi-function peripheral) 11C, other printing devices 11D, etc., and assorted user terminals, such as personal computer 12A, notebook computer 12B, workstation 12C, other terminals 12D, etc., from which print jobs can be submitted. The printing devices 11A-11D and user terminals 12A-12D are connected to print server 15 through network 13A (a wired or wireless network, such as a local area network, a wide area network or any type of network such as an intranet, an extranet, the Internet, or a combination thereof).

The print server 15 includes a print job processing part 15a and a dynamic advertisement selection part 15b. print job processing part 15a processes print jobs and maintains print queues for each of the printing devices 11A-11D. When an appropriate print job is received, the dynamic advertisement selection part 15b consults with database 14 (AdDB) to select one (or more) of a plurality of advertisements stored in the database 14 based on dynamic selection criteria, and the print job processing part 15a causes a printing device to generate a printout of the print job and print the selected advertisement on at least a portion of a page of the printout.

The AdDB is connected to the print server 15 through a network 13B which can be the same or a different network as the network 13A. The AdDB stores advertisements and associated indexing information, including identification of the advertiser (that is, the party placing the advertisement), information indicating the subject matter of the advertisement, the relevant time period, the relevant audience, etc. In a preferred embodiment, the AdDB is maintained by a service and is connectable through the Internet.

An example of data flow in the system 10 will now be discussed.

A user can submit a print job using any of the user terminals 12A-12D through a wired or wireless connection to the network 13A (step S21). The print server processes the print job received from the user terminal, and then consults the AdDB based on print information (for example, number of pages, size, color/monochrome, user information, etc.) (step S23). Based on the print information, one or more advertisements are selected at the AdDB end, and returned to the print server (step S25). The print server processes the advertisements received from the AdDB, and causes a printout of the print job with the advertisements on appropriate portions of pages of the printout to be generated (step S27).

Figure 1B:
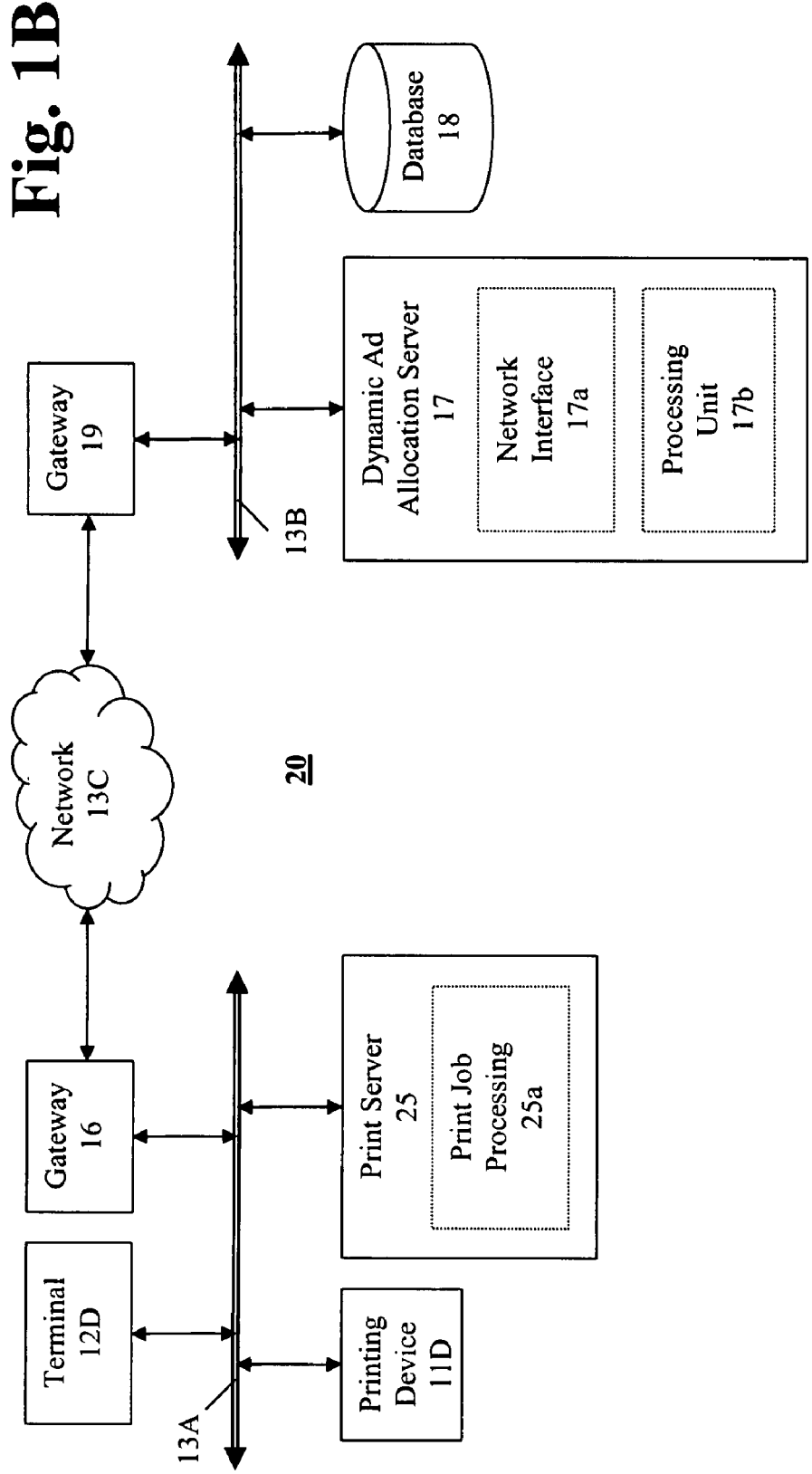
FIG. 1B shows a block diagram of a printing system, in accordance with a preferred second embodiment of the present disclosure.
Figure 2:
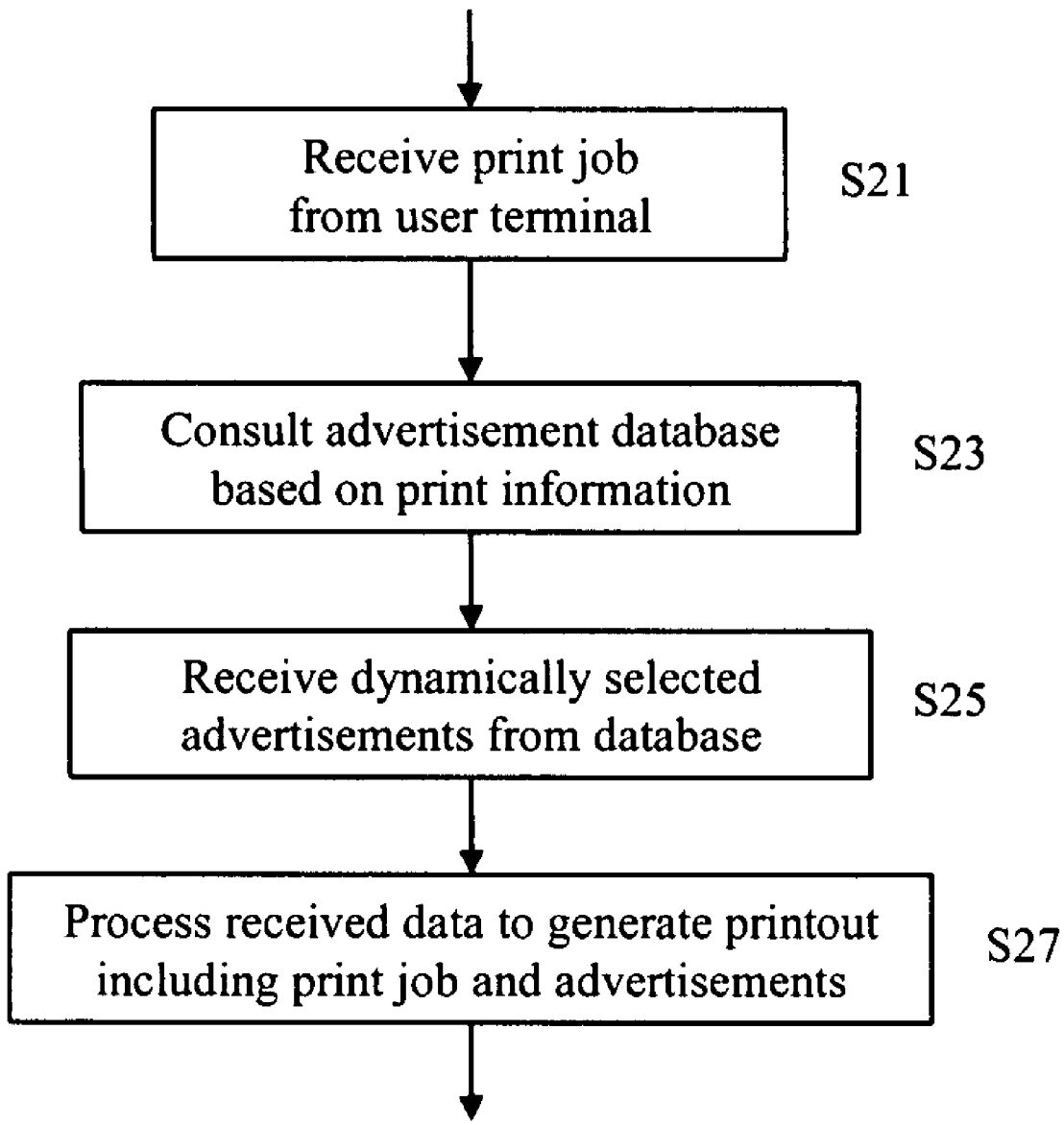
FIG. 2 shows a flow chart of a method for processing a print job, in accordance with a preferred embodiment of the present disclosure.

In a preferred second embodiment (FIG. 1B), print server 25 is configured with a print job processing part 25a, and when a print job is received, the print server 25 transmits a request for advertisement data to dynamic ad allocation server 17 in system 20. The dynamic ad allocation server 17 facilitates consultation with the AdDB 18 and is connected to the print server 15 via gateways 19 and 16 to the Internet 13C. In the preferred embodiment, the dynamic ad allocation server 17 includes a network interface 17A and a processing unit 17b which processes consultation requests or queries. The network interface 17A enables the dynamic ad allocation server 17 to receive, and respond to, requests through a network connection (for example, to the Internet or another IP-based network). The processing unit 17B processes consultation requests to select relevant advertisements.

A number of tasks take place at the AdDB end. For example, when a request is received from the print server, the processing unit processes the print information and the consultation request, and determines the number of advertisements that will be returned to the print server, the size of each advertisement, whether each advertisement is monochrome or color, etc. The processing unit then selects one or more appropriate advertisements from the AdDB, based on dynamic selection criteria (discussed infra), and data for the selected advertisements is returned to the print server.

After the print server receives the advertisement data, the print server rips (that is, raster image processes) the data and generates the combined data (for example, Postscript, bitmap, etc.) for the printout including the print job and the advertisement(s), which may include processing (for example, shrinking) the original advertisement to fit to the printable unused areas (on the printout). The advertisement can be included at any of various locations on the printout.

The advertisement can be printed on the margins of the pages containing the print job. However, it was found that users sometimes complained that such advertisements on the margins are inconvenient (since the user may wish to maintain the printout of the print job as a clean copy or a record copy, and such advertisements are not desirable in such clean or record copies). Therefore, while the advertisements can be printed in the margins of the printout in at least some instances, it is not preferred.

Advertisements can also be printed on cover and/or partition sheets, as an alternative. However, many print jobs are printed without a cover or partition sheet.

Other more desirable locations for printing advertisements include printing on the back of the printout sheets, when the print job is simplex (but the printing device has duplex capabilities). Thus, a sheet of the printout can include the print job on one side and one or more advertisements on the other side.

In another example, the printout can be made on paper of a size larger than the paper size of the print job. For example, the print job may be specified to be letter-size (8"×11"), and the printout may be on legal-size paper (8"×14") with the print job occupying a letter-sized portion of each page, and advertisement(s) occupying the remaining portion of the pages. The two portions may be divided by a dashed or dotted line, such that the user can easily cut the portion containing the advertisement, if it is so desired. In addition, the legal-size paper may include a perforated line dividing the legal-size portion, on which the print job is printed, and the remaining portion, on which advertisement is printed, to facilitate tearing the remaining portion from the letter-size portion.

In addition, some pages of a printout which include a portion of the print job may include unused areas. For example, in many instances, the last page of the printout is only partially used in many instances. Further, other pages may be ended by a hard page break, and therefore, such pages may also include unused areas. Waste of the unused areas can be avoided by including one or more advertisements in such areas. Detection of such areas will typically be performed on the print server end.

Examples of dynamic selection criteria will now be discussed.

The advertisements are preferably selected dynamically such that the advertisements printed do not follow a pattern, and are not the same set of advertisements over any extended period of time. The advertisement selection process can be dynamic in a number of ways.

As mentioned above, the cost of printing is preferably recouped from fees charged to advertisers. In a preferred embodiment, the higher the fee that an advertiser pays, the higher the frequency that the advertisements of the advertiser are printed. This approach can be implemented in any of a number of different ways.

For example, the selection process may include first picking one advertiser from a pool of paying advertisers (each advertiser has a weighted entry corresponding to the fee it pays, relative to the fees paid by the other advertisers), and then selecting one of the advertisements from the elected advertiser. In another example, selection of advertiser is made from a pool of entries and each advertiser has a number of entries corresponding to the fee it pays, relative to the fees paid by the other advertisers. Thus, advertiser A1 who pays a fee that is double the fee paid by advertiser A2 will have twice as many entries as advertiser A2, and advertiser A3 who pays a fee that is double the fee paid by advertiser A1 will have four times as many entries as advertiser A2. Aside from the weighting, selection is preferably random, with or without replacement (to the pool). In such an example, each of N advertisers has a corresponding weight or sampling frequency $(X_1, X_2, \ldots X_N)$, and the probability of an advertiser Ai being selected is $X_i/\Sigma X_n$.

Other weighted methods of selection can alternatively be used. On the other hand, a scheduled or round-robin approach can be adopted, wherein in each round of the schedule, advertiser A3 will determinatively occupy four times as many slots in the schedule as advertiser A2 and twice as many slots as advertiser A1, but each advertiser will be guaranteed to have an appropriate number of its advertisements printed.

As mentioned above, the selection from the pool of specific advertisements is preferably dynamic. The AdDB can interactively connect to advertisement clients (that is, advertiser) to obtain dynamic advertisement contents. Thus, the store of advertisements is fresh and up-to-date, in accordance with the current preferences of the advertiser.

Further various criteria may affect the selection process. For example, the pool of advertisements may be filtered according to the location from which the print job came. Thus, if the print job was submitted from a terminal on or near a university campus, the pool may be filtered to include only advertisements that are targeted to college students (for example, pizza coupons, advertisements for books or school supplies, advertisements for vacation during spring break, etc.). On the other hand, if the print job is being submitted at or from a retail establishment (for example, Staples, Seven-Eleven, etc.) or a transportation depot (for example, airport, train station, bus depot, etc.), the advertisements may be directed to products or services available (specifically or generally) from stores at or near that location.

As another example, the identification or classification of the user who submitted the print job is used to determine the relevant audience, and the pool of advertisements is filtered accordingly. The identification or classification of the user can be determined in any of many ways known in the art, such as through cookies residing on the user terminal, through user authentication obtained at the user terminal, such as via biometrics (for example, fingerprint, processing and/or recognition of image obtained through camera or speech or voice captured through microphone at or near user terminal, etc.). Even if the information does not identify the specific individual, but merely classifies the individual, according to gender, age, etc., the classification information can be used to selectively adjust the pool of advertisements such that the selected advertisement is more likely to be catered to the audience.

In addition, the pool of advertisements may be filtered according to time, date and/or season. For example, when a print job is being submitted in January, the pool may include advertisements for vacations to ski or tropical resorts and advertisements for cold or flu remedies (and advertisements involving outdoor activities, such as BBQ grills, are filtered out). As another example, if a print job is being submitted at 8 p.m. on a Friday night, the pool may include advertisements or coupons for nightclubs and restaurants (and advertisements directed to commuters may be filtered out).

Advertisements in the store may be organized in virtual bins. A bin may correspond to a specific advertiser or advertiser group, age group, gender group, season, temporal group, location, etc. In addition, advertisements may be grouped according to sponsorship category (for example, food category, clothing category, office supplies category, books and school supplies category, etc.), as well as subcategories (for example, foods and drinks categorized according to audience—pizza, soda/beer and budget restaurants for college students, and coffee, wine and gourmet foods for others).

As mentioned above, the term "advertisement" is generically used herein to include coupons. In the case that coupons are printed along with the print job on the printout, the cost or printing may be recouped not by upfront fees paid by the advertisers, but rather through commissions based on exposure rate information. In such instances, the coupons include bar codes which encode printing device and location information. For example, 2D barcodes (such as PDF417) may be used to encode more information than can be encoded with 1D barcodes. When a coupon is redeemed, a credit is applied from the account of the vendor to the account of the printing service provider.

In the preferred embodiment discussed supra, the print server is dynamically linked to the AdDB which hosts up-to-date advertisement information for the advertisement clients and randomly sends relevant advertisements to the print server. In addition, AdDB balances the advertisement distribution based on the advertisement clients specific needs and prepayment.

The dynamic ad selection of the subject matter of the present disclosure can include multiple facets. As one aspect, the advertisement content is dynamic, as the ad database is dynamically updated to keep the content up-to-date, such that each advertiser has some real-time control over its advertisement content. As another aspect, the advertisement opportunities are dynamically allocated amongst multiple advertisers, and therefore the printed advertisements can have no pattern of repetition. Further, the advertisement content can be dynamically selected according to one or more criteria, that renders the content relevant to the audience. The term "dynamic selection criteria" can include all or some of these aspects.

Although the embodiments discussed supra involve a print server, it should be understood that the subject matter of this disclosure is not limited thereto.

Another embodiment is discussed infra with reference to FIGS. 3A-3D. In the printing system shown in FIG. 3A, a plurality of locations (A, B, . . . Z) are connected through a network such as the Internet to an ad server. Each location includes one or more printing devices. When a print job is submitted at a location, a print interface at the location submits print information to the ad server. The print interface may reside on a print server (as discussed above in connection with the embodiments of FIGS. 1A and 1B), on a printing device (discussed infra), or at a kiosk (discussed infra). In any event, the server uses the print information along with other information (for example, location, time, season, etc.) to consult an ad database.

The ad database may be organized as tables of pointers or links (alternatively, a relational database management system may be used). As an example (FIG. 3B), a consultation may start by using the location information to index the location table which contains a plurality of pointers for respective location categories (for example, train station, university library, convenience store, Internet cafe, etc.). Each pointer from the location table links the corresponding location to a sponsorship table of a plurality of sponsorship categories (for example, in the case of university library being the location, food, clothing, office supplies, books, etc.). Each category may include a plurality of pointers to advertisements corresponding to the category.

In another example (FIG. 3C), consultation starts by using time information (for example, morning, afternoon, evening, late night) to index a table of pointers to respective sponsorship tables (for example, food, clothing, etc.). Each sponsorship table includes pointers to respective subcategory tables. In FIG. 3C, the food category includes pointers to pizza, subs and coffee/drinks subcategories, and the clothing includes pointers to underwear, sweats and pajamas subcategories. Each subcategory may include a plurality of pointers to advertisements corresponding to the subcategory.

In a third example (FIG. 3D), consultation starts by using season information (for example, winter, spring, summer, fall) to index a table of pointers to respective sponsorship tables (for example, food, clothing, etc.). Each sponsorship table includes pointers to respective subcategory tables (like example of FIG. 3C). In FIG. 3D, each subcategory includes pointers to advertisement products, such as in the case of the pizza subcategory, spring special, end-of-winter special, Easter special, etc. Each advertisement product may include one or more pointers to advertisements corresponding to the advertisement product.

Figure 3A:
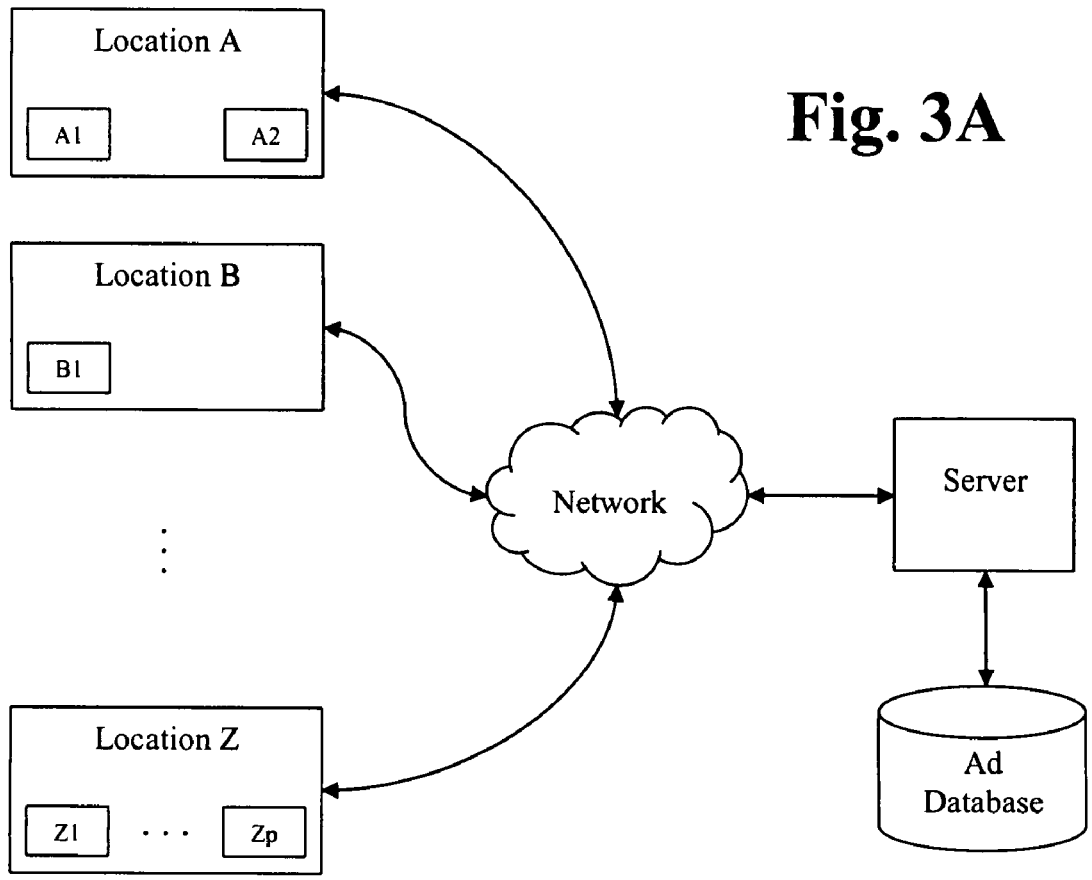
FIG. 3A shows a schematic view of a system, in accordance with another embodiment.
Figure 3B:
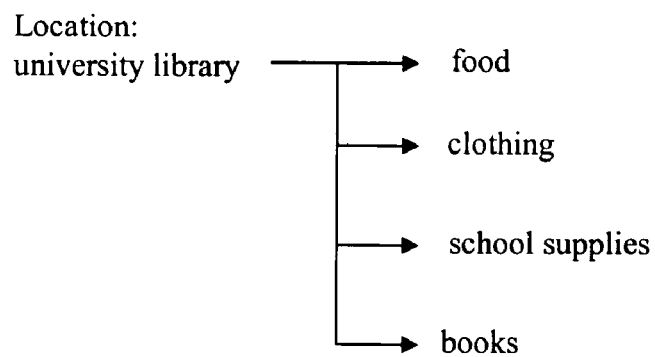
FIGS. 3B-3D show schematic views of examples of the data in the ad database of the system shown in FIG. 3A.
Figure 3C:
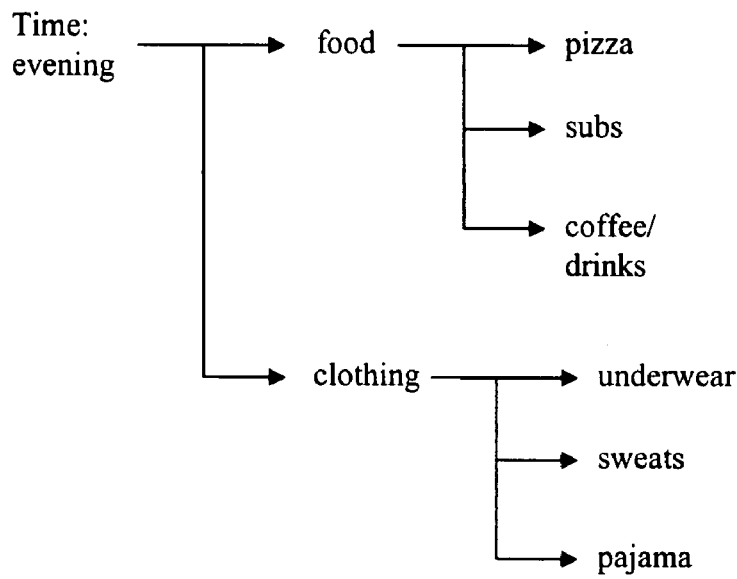
Figure 3D:
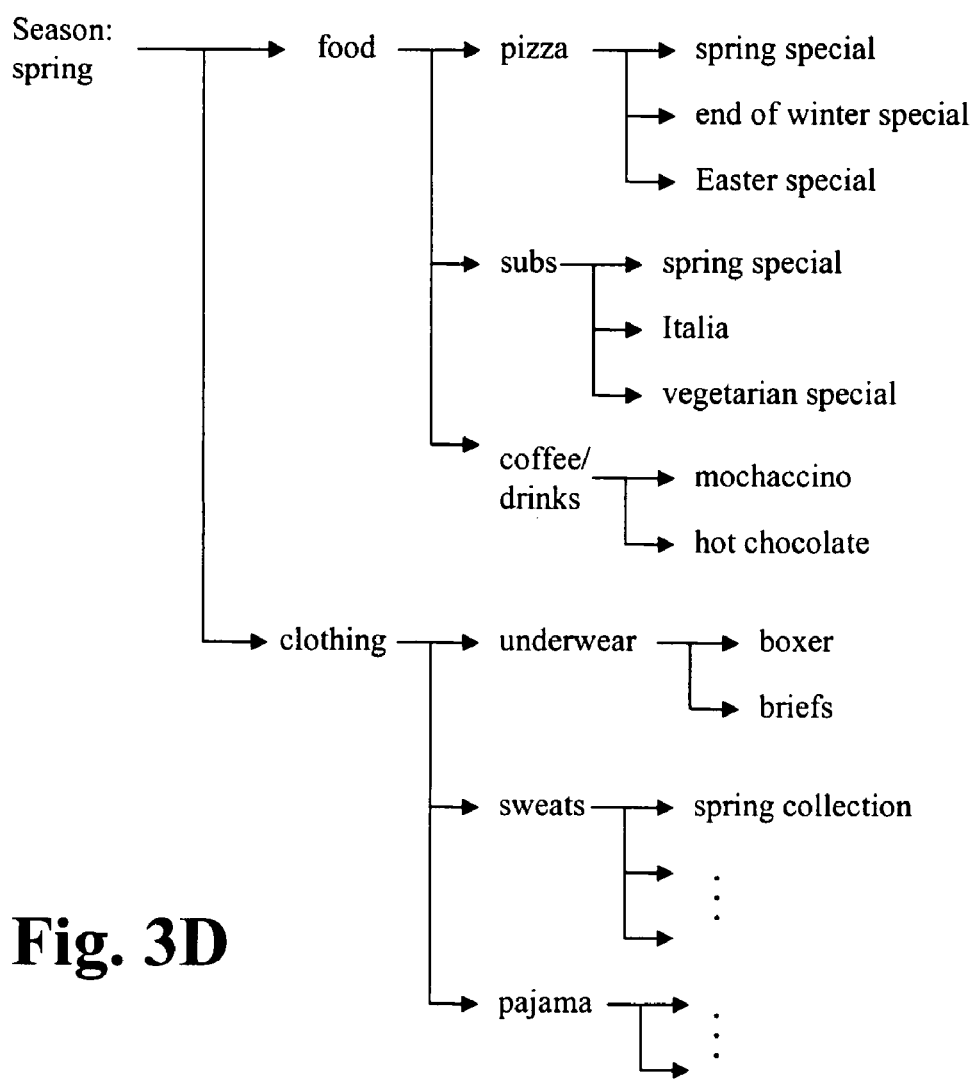

Location B in FIG. 3A has a single printing device B1. Location B may be, for example, a kiosk (such as in a public area) with a camera.

Figure 4A:
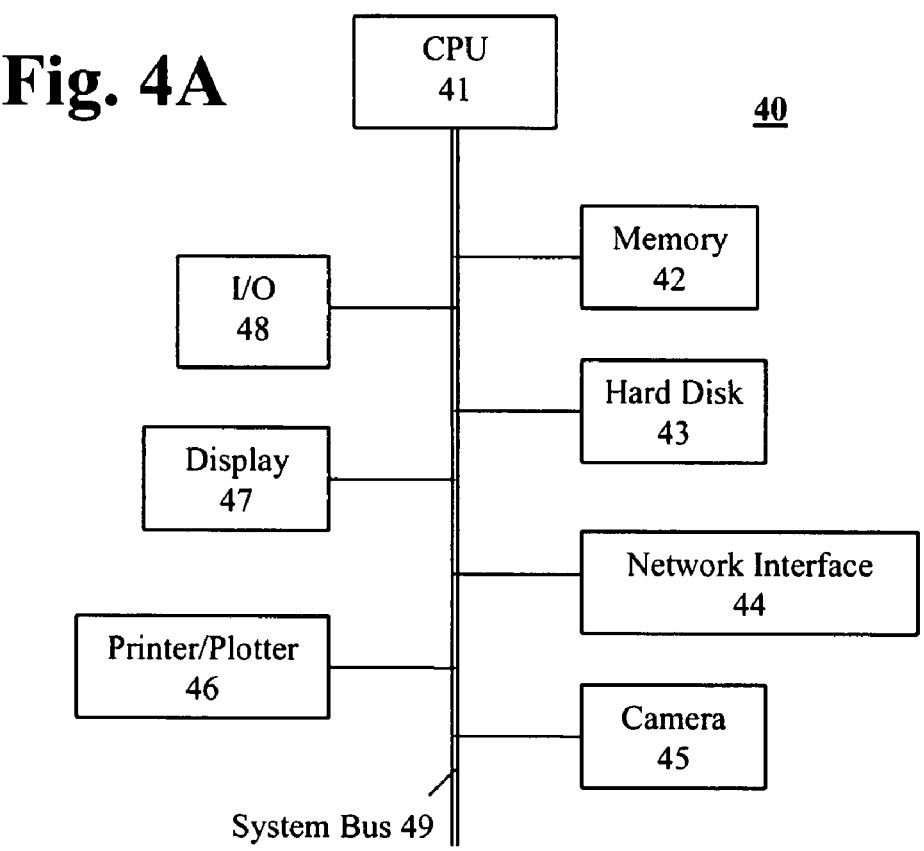
FIG. 4A shows a block diagram of a kiosk configured with a camera and shape recognition capabilities.

An exemplary configuration of a kiosk is shown in FIG. 4A. Kiosk 40 includes CPU 41, memory 42, hard disk (and controller) 43, network interface 44 (for communications through a wired or wireless network), camera 45, printer/plotter 46, user interface and display 47, input/output (and controller) 48, all of which are connected through system bus 49. The kiosk can be configured through software to provide assorted user features.

Figure 4B:
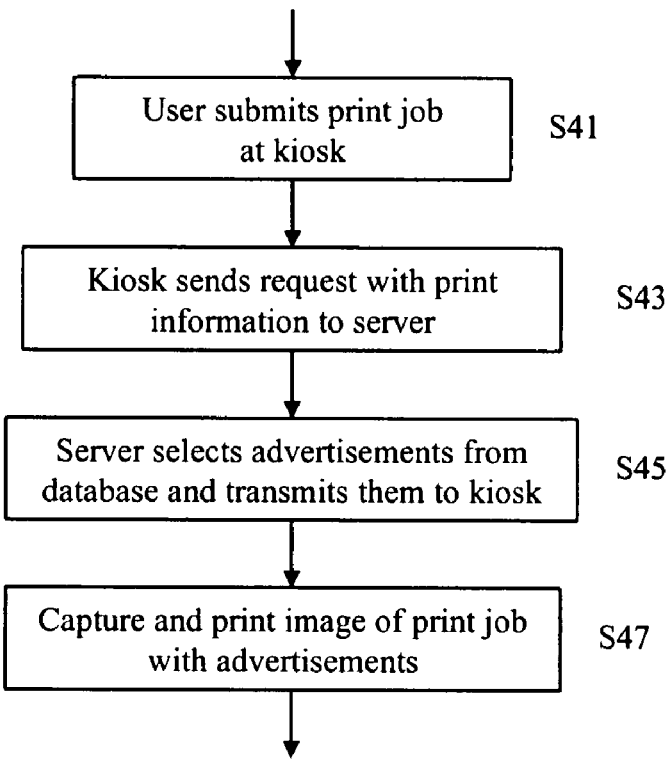
FIG. 4B shows a workflow in the kiosk of FIG. 4A.

The kiosk may be configured (for example via a Java application or other software) to take a picture of the user requesting a print job, and perform shape recognition based on digital picture data to make a determination of whether the user is male or female. The gender information obtained thereby may be used to further target the advertisement selection. A workflow in such an example is explained below with reference to FIG. 4B.

The user operates the kiosk user interface to submit a print job to the printing device provided at the kiosk (step S41). The kiosk sends a request along with print information to the server (step S43), like in the example of FIG. 3A. The server selects a few (for example, 3 or 4) advertisements that are appropriate under the circumstances, and transmits them to the kiosk (step S45). The kiosk may have an enhanced locked print function, and in such an instance, the user presses a predetermined key to release the print job, and thereafter an image of the print job along with one or more received advertisements selected by the kiosk to be best fit is captured and printed (step S47).

As mentioned above, a printing device may be configured through a Java application (and/or other software) and sufficient processing, storage and communication capabilities to interface with an ad database directly or through a dynamic ad allocation server. Such an example is shown in FIG. 5. In system 50, printing device 51 includes a print job processing part 51a, a print engine 51c, as well as other elements typically fund in a printing device. The print job processing part 51a processes a print job received through the network 13A from terminal 52 and communicates with dynamic ad allocation server 17 to obtain one or more advertisements from ad database 18. After the printing device receives the advertisement data, the print job processing part 51a causes the print engine 51c to generate a printout of the print job and print the advertisement(s) on at least a portion of a page of the printout.

Additional configurations of the printing system are possible. For example, the printing device or kiosk may have a wireless interface that enables a terminal to communicate and transmit a print job to the printing device or kiosk through a wireless transmission (for example, via Bluetooth or another protocol).

The subject matter of this disclosure enables a number of novel and useful business models.

For example, a vendor can provide printing service or printing equipment to various locations, without charge to the user. At the same time, an advertiser contracts with the vendor to enable the advertiser to have its advertisements included, under specified terms, when print jobs are printed at the locations. In this example, the advertiser prepays for the service.

In another example, the advertiser contracts with the vendor to have coupons printed along with print jobs. The coupons include bar codes (discussed supra) encoding printer location information as well as assorted other coupon information, such as for tracking purposes. The advertiser may pay the vendor according to success of the exposure (that is, number of coupons redeemed), with or without prepayment.

In either example, the vendor may supply the advertisement service with or without printer equipment. In addition, the vendor may provide usage tracking information to the advertisers.

The above specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. An apparatus for printing an advertisement on a printout of a print job, said apparatus comprising:
   a print job processing part configured to receive a print job through a network from an information terminal;
   a dynamic advertisement selection part configured to select one of a plurality of advertisements stored in a database based on dynamic selection criteria, after said print job processing part receives the print job,
   wherein said print job processing part causes a printing device to generate a printout of said print job and print the selected advertisement on at least a portion of a page of said printout after said print job processing part receives the print job,
   wherein the dynamic advertisement selection part selects one of the plurality of advertisements based on, at least in part, (i) a location of the information terminal from which the print job is received, and (ii) a time at which the print job is received from the information terminal, and
   wherein said dynamic advertisement selection part generates a pool of weighted candidate advertisements by associating each candidate advertisement of said pool of candidate advertisements with a corresponding weight value according to a price paid by a corresponding advertiser for the posting of the specific advertisement,
   the pool of weighted candidate advertisements is filtered to include advertisements associated with the location of the information terminal from which the print job is received,
   the pool of weighted candidate advertisements is filtered to include advertisements associated with the time at which the print job is received, and
   the dynamic advertisement selection part selects the selected advertisement at random with or without replacement to the pool, from the pool of weighted candidate advertisements, such that a higher-weighted candidate advertisement is more likely to be selected from the pool than a lower-weighted candidate advertisement.

2. The apparatus of claim 1, wherein said dynamic advertisement selection part associates each advertisement with a corresponding temporal period, and the selected advertisement is selected from a subset of the pool of weighted candidate advertisements containing only advertisements associated with a specific temporal period corresponding to said time at which the print job is received from the information terminal.

3. The apparatus of claim 1, wherein said dynamic advertisement selection part associates each advertisement with a corresponding location, and the selected advertisement is selected from a subset of the pool of weighted candidate advertisements containing only advertisements associated with a specific location corresponding to a location of the information terminal from which the print job is received.

4. The apparatus of claim 3, wherein said specific location corresponding to said location of the information terminal is one of a library, an educational institution, a retail location, a transportation terminal, a kiosk and a place accessible to the general public.

5. The apparatus of claim 1, wherein said dynamic advertisement selection part associates the selected advertisement with a specific temporal period corresponding to said time at which the print job is received from the information terminal, the selected advertisement includes a coupon, and the coupon is applicable to purchase of goods or service related to the specific temporal period.

6. The apparatus of claim 1, wherein the selected advertisement includes a coupon and is printed at or from a specific location, and the coupon is applicable to purchase of goods or service at or near the specific location.

7. The apparatus of claim 1, wherein the selected advertisement includes a coupon and the coupon is printed along with a barcode at a specific location, and said barcode identifies the specific location.

8. The apparatus of claim 1, wherein the print job from the information terminal specifies a specific paper size, the printing device generates the printout on printing paper of a size larger than said specific size in which said print job is printed on a first portion of the printing paper corresponding to said specific size, and the selected advertisement is printed on a second portion of the printing paper corresponding to a remainder of the printing paper not occupied by said first portion of the specific size.

9. The apparatus of claim 1, wherein said apparatus causes the printing device to generate the selected advertisement on a back of the page of the printout.

10. A non-transitory computer readable medium tangibly embodying a program of instructions executable by a computer, said program comprising:
    a print job processing part configured to process a print job received through a network from an information terminal; and
    a dynamic advertisement selection part configured to select, based on dynamic selection criteria, one of said plurality of advertisements stored in a database, after said print job processing part receives the print job,
    wherein said print job processing part causes a printing device to generate a printout of said print job and print the selected advertisement on at least a portion of a page of said printout after said print job processing part receives the print job, and
    wherein the dynamic advertisement selection part selects one of the plurality of advertisements based on, at least in part, (i) a location of the information terminal from which the print job is received, and (ii) a time at which the print job is received from the information terminal, and wherein said dynamic advertisement selection part generates a pool of weighted candidate advertisements by associating each candidate advertisement of said pool of candidate advertisements with a corresponding weight value according to a price paid by a corresponding advertiser for the posting of the respective advertisement, the pool of weighted candidate advertisements is filtered to include advertisements associated with the location of the information terminal from which the print job is received, the pool of weighted candidate advertisements is filtered to include advertisements associated with the time at which the print job is received, and the dynamic advertisement selection part selects the selected advertisement at random with or without replacement to the pool, from the pool of weighted candidate advertisements, such that a higher-weighted candidate advertisement is more likely to be selected from the pool than a lower-weighted candidate advertisement.

11. A printing system comprising:
one or more information terminals;
a database storing a plurality of advertisements;
a printing device; and
a print job processing part configured to receive a print job through a network from one of said information terminals, select one of said plurality of advertisements stored in said database based on dynamic selection criteria, after said print job processing part receives the print job, and cause said printer to generate a printout of said print job and print the selected advertisement on at least a portion of a page of said printout after said print job processing part receives the print job, wherein the print job processing part selects one of the plurality of advertisements based on, at least in part, (i) a location of the information terminal from which the print job is received, and (ii) a time at which the print job is received from the information terminal, and wherein said print job processing part generates a pool of weighted candidate advertisements by associating each candidate advertisement of said pool of candidate advertisements with a corresponding weight value according to a price paid by a corresponding advertiser for the posting of the respective advertisement, the pool of weighted candidate advertisements is filtered to include advertisements associated with the location of the information terminal from which the print job is received, the pool of weighted candidate advertisements is filtered to include advertisements associated with the time at which the print job is received, and the dynamic advertisement selection part selects the selected advertisement at random with or without replacement to the pool, from the pool of weighted candidate advertisements, such that a higher-weighted candidate advertisement is more likely to be selected from the pool than a lower-weighted candidate advertisement.

12. A method for presenting advertisement on a printout of a print job, said method comprising the steps of:
(a) receiving a print job submitted by a user of an information terminal;
(b) selecting one of a plurality of advertisements stored in a database based on dynamic selection criteria and based on, at least in part, (i) a location of the information terminal from which the print job is received, and (ii) a time at which the print job is received from the information terminal, after receiving the print job in step (a); and
(c) generating a printout of said print job through a specified printing device and printing the selected advertisement on at least a portion of a page of said printout after receiving the print job in step (a), wherein a pool of weighted candidate advertisements is generated by associating each candidate advertisement of said pool of candidate advertisements with a corresponding weight value according to a price paid by a corresponding advertiser for the posting of the respective advertisement, the pool of weighted candidate advertisements is filtered to include advertisements associated with the location of the information terminal from which the print job is received, the pool of weighted candidate advertisements is filtered to include advertisements associated with the time at which the print job is received, and the selected advertisement is selected at random with or without replacement to the pool, from the pool of weighted candidate advertisements, such that a higher-weighted candidate advertisement is more likely to be selected from the pool than a lower-weighted candidate advertisement.

13. The method of claim 12, wherein each advertisement is associated with a corresponding temporal period, and the selected advertisement is selected from a subset of the pool of weighted candidate advertisements, said subset containing only advertisements associated with a specific temporal period corresponding to said time at which the print job is received from the information terminal.

14. The method of claim 13, wherein said specific temporal period corresponding to said time at which the print job is received from the information terminal is one of a season, a month, a week, a day, and a time of a day.

15. The method of claim 12, wherein each advertisement is associated with a corresponding location, and the selected advertisement is selected from a subset of the pool of weighted candidate advertisements, said subset containing only advertisements associated with a specific location corresponding to a location of the information terminal from which the print job is received.

16. The method of claim 15, wherein said specific location corresponding to said location of the information terminal from which the print job is received is one of a library, an educational institution, a retail location, a transportation terminal, a kiosk and a place accessible to the general public.

17. The method of claim 12, wherein the selected advertisement printed on said at least a portion of a page of the printout includes a coupon.

18. The method of claim 17, wherein the selected advertisement is associated with a specific temporal period corresponding to said time at which the print job is received from the information terminal, and the coupon is applicable to purchase of goods or service related to the specific temporal period.

19. The method of claim 17, wherein the selected advertisement is printed on said at least a portion of the page of the printout by said printing device at a specific location, and the coupon is applicable to purchase of goods or service at or near the specific location.

20. The method of claim 17, wherein the coupon is printed along with a barcode on said at least a portion of the page of the printout by said printing device at a specific location, and said barcode identifies at least one of the printing device and the specific location.

21. The method of claim 20, wherein when the coupon is redeemed the bar code is utilized to compile exposure rate information.

22. The method of claim 12, wherein the print job from the information terminal specifies a specific paper size, the printout is generated on printing paper of a size larger than said specific size, said print job is printed on a first portion of the printing paper, and the selected advertisement is printed on a second portion of the printing paper, said first portion corresponding to said specific size, and said second portion corresponding to a remainder of the printing paper not occupied by said first portion of the specific size.

* * * * *